United States Patent [19]

Hyde

[11] Patent Number: 4,720,076

[45] Date of Patent: Jan. 19, 1988

[54] DISPENSE TAP

[75] Inventor: Roger J. Hyde, Kettering, England

[73] Assignee: Alumasc Limited, Kettering, England

[21] Appl. No.: 797,984

[22] Filed: Nov. 14, 1985

[30] Foreign Application Priority Data

Nov. 30, 1984 [GB] United Kingdom ................. 8430324

[51] Int. Cl.[4] .......................... F16K 47/00; F16K 7/00

[52] U.S. Cl. .................................... 251/122; 222/547; 239/110; 239/583; 251/331; 251/335.2

[58] Field of Search ............... 251/118, 119, 120, 121, 251/122, 335.2, 331, 335.1; 137/600, 170.1, 170.5, 801; 239/583, 574, 110, 589; 222/547, 564, 575

[56] References Cited

U.S. PATENT DOCUMENTS

| | | | |
|---|---|---|---|
| 182,015 | 9/1876 | Blake | 251/120 |
| 2,035,202 | 3/1936 | Smith | 251/335.2 |
| 2,097,020 | 10/1937 | Cornelius | 251/120 |
| 2,165,605 | 8/1939 | Baker | 251/120 X |
| 2,236,620 | 4/1941 | Cornelius | 251/335.2 |
| 3,512,550 | 5/1970 | Ammann | 251/122 |
| 4,413,646 | 11/1983 | Platt et al. | 251/122 |

FOREIGN PATENT DOCUMENTS

| | | | |
|---|---|---|---|
| 23083 | 3/1907 | France | 251/331 |
| 669743 | 4/1952 | United Kingdom . | |
| 754149 | 8/1956 | United Kingdom | 251/335.2 |
| 1261384 | 1/1972 | United Kingdom | 137/600 |

*Primary Examiner*—George L. Walton

*Attorney, Agent, or Firm*—William R. Hinds

[57] ABSTRACT

A dispense tape (10) to control the flow of carbonated beers is configured to minimize pressure drop and turbulence in beer flow to an outlet nozzle (14) when open, the tap having flow restrictor means (52) operatively connected as a downstream extension of the tap valve (30), located in the path of beer flowing from the valve, arranged only to affect beer flow when the tap is nearly closed and configured to substantially restrict beer flow to maximize pressure drop and turbulence; choice of nozzle length/bore ratio enabling either a creamy flow or a squib of beer to be dispensed.

4 Claims, 5 Drawing Figures

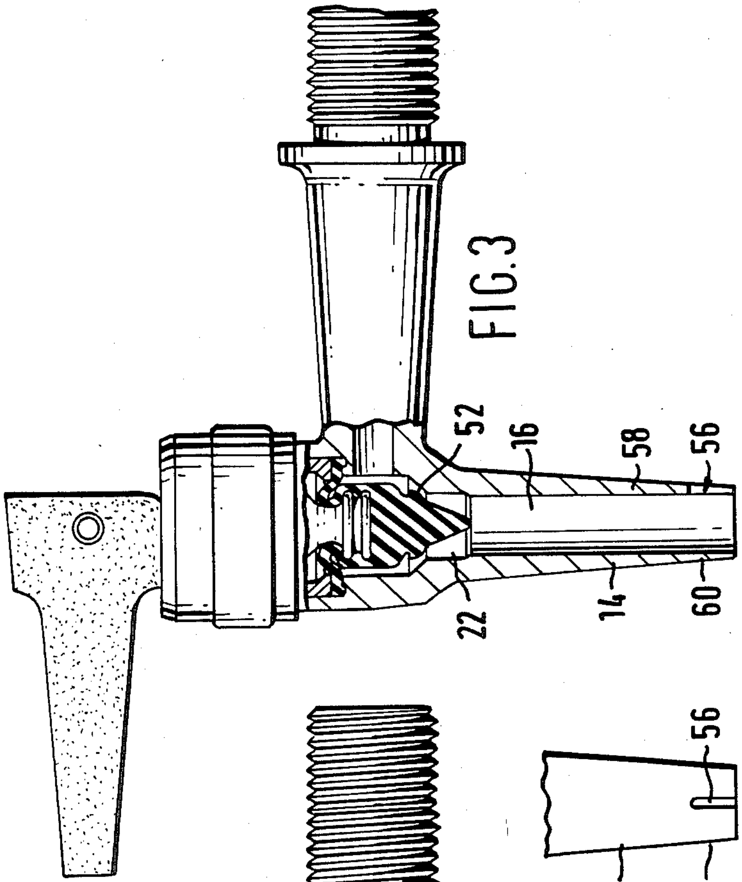
FIG. 3
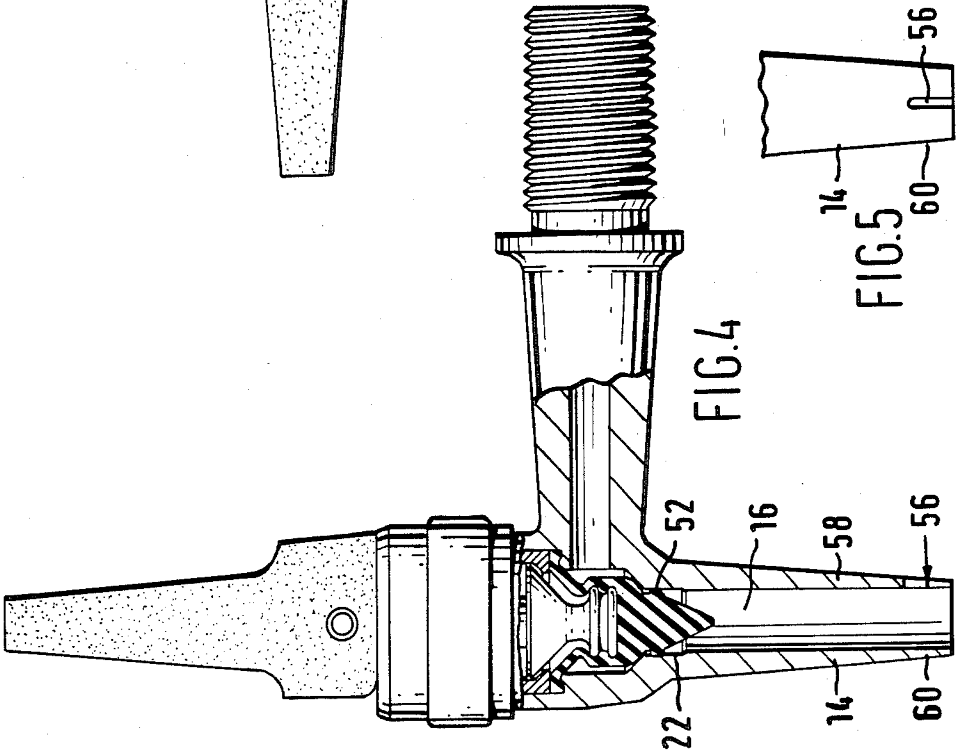
FIG. 4
FIG. 5

DISPENSE TAP

This invention relates to taps for serving beer from casks, kegs or the like wherein carbon dioxide is employed as the dispensing/preservative medium; hereinafter referred to as "carbonated beer".

Carbonated beers differ as to their carbon dioxide content and the way in which the head on a glass of beer is presented varies both as to the type of beer (bitter, lager, stout) and the country or part of the country in which the beer is being served. Conventional dispense taps for carbonated beers only have the facility to allow a straight full flow of beer into a glass. For example, when the highly carbonated beer is dispensed, the head is formed either by natural precipitation of carbon dioxide from solution or, if dispensed in a calm manner, by subsequent agitation; in either case, vast amounts of overspill can be produced. Low carbonation beers, on the other hand, do require some form of agitation to encourage a head and, when such a beer is being dispensed, it is usual to fit a "sparkler" device to the outlet of the dispense tap. By virtue of their adjustment and fitting these devices are somewhat unhygenic.

It has already been proposed in United Kingdom Patent Specification No. 1261384 (Chadburns) to provide a dispense tap for carbonated beer having "a passageway through it designed or provided with means to prevent excessive foaming of frothing of the liquid to be dispensed, a valve for controlling the flow of liquid through said passageway, a further passageway through the tap including a port, in said valve, which restricts the flow of liquid so at to promote or ensure the formation of a "head" of froth or foam on the liquid as it is dispensed, a valve for controlling the flow of liquid through said port and means for selectively operating said valves so as to direct the liquid through one passageway or the other As further described in the Chadburns' specification "one passageway has a restricted outlet orifice which produces a high velocity jet through the dispensing spout of the tap. This jet violently agitates the beer in the glass or other container, should it be "flat" and gives it the desired "sparkle", "head" or froth.

Agitation of a "flat" beer to enhance its appearance may be promoted be venting the spout to cause it to empty at each operation. On the other hand, it is of advantage no to vent the spout it it is desired to give the beer a fine froth or "creamy" head. The spout then remains full of beer at all times and the action of the above-mentioned jet or squib of beer can be to agitate the main top of the beer in the spout and thereby produce the desired creamy head on the top of the beer or stout in the glass.".

United Kingdom Patent Specification No. 2049016A (Millington) discloses a tap for dispensing carbonated liquids which "as it progressively opened and the regulator moved upwards the length of the aforesaid annular channel is reduced and the volume within the spout at the transition point 20 is increased". (see page 1, lines 85–89). The reason for this transition point is given as "These automatic adjustments within the tap enable it to be used by unskilled operators for dispense of carbonated liquids." (see page 1, lines 90–92).

United Kingdom Patent Specification No. 977660 (Dole Valve) discloses a fluid flow control valve for use in dispensing beverages such as beer or carbonated drinks or the like and having "a spiral form groove 40 is cut within the side wall of the boss 39 to define a spiral form passage between the boss 39 and the wall of the housing.

Consequently, when the valve rod 31 is in the position shown in FIG. 1, liquid can freely pass from the inlet end of the chamber between the inclined seat 34 and the complimentary face of the valve member 37 and thence through the spiral form passage formed between the boss 39 and the housing wall to the outlet end of the chamber 16 and then through the outlet passage 22." (see page 2, lines 65–77). The only function given for thin spiral groove is at page 1, lines 29–36 "The valve member has a portion whose periphery closely fits a portion of the inner surface of the chamber and a fluid flow restriction passage is provided at the interface between such portions of the valve member and the chamber for restricting the flow of fluid through the valve on opening of the valve.".

Such a long groove could only promote smooth, laminar flow and the function of the groove is thought to be some kind of flow control that would prevent surging of the beverage during initial opening of the valve.

United Kingdom Specification No. 956901 (Guinness) discloses a flow control valve for incorporation in the delivery line or in some cases in the dispensing tap itself and which will "permit, when desired, a smooth flow of the liquid to by-pass the holes in the perforated plate with the object of varying the amount of head produced on the liquid when dispensed." (see page 1, lines 38–43).

United Kingdom Patent Specification No. 669,743 (Walsh) discloses a beer tap with "a conical or rounded end, for providing a throttling passage to such opening." (see page 2, lines 39+40).

It is an object of the present invention to provide a dispenser tap for cabonated beers that can form either creamy of foamy heads on the beers when dispensed using a design that is simpler to produce, use, clean and operate than the above-described dispense taps or fluid control valves.

According to the present invention, a dispense tap to control the flow of carbonated beers is configured to minimise pressure drop and turbulence in beer flow to an outlet nozzle when open, the tap having flow restrictor means operatively connected as a downstream extension of the tap valve, arranged only to affect beer flow when the tap is nearly closed and configured to substantially restrict beer flow to maximise pressure drop and turbulence. None of the above-described dispenser taps or flow control valves disclose restrictor means configured to substantially restrict beer flow to maximise pressure drop and turbulence and arranged only to affect beer flow proximate the closed position of a dispense tap that is also configured, when fully open, to minimise pressure drop and turbulence in beer flow through the same passageways in the tap.

In an embodiment of the present invention, the valve is a reciprocating valve having a valve member moveable towards and away from a valve seat formed about a tapered counterbore that communicates with the outlet nozzle, the valve member having an integral extension that projects into the counterbore and the extension having a radially outwardly directed flange that engages the counterbore only when the valve is closed; whereby opening the valve to lift the valve member off the valve seat also raises the extension within the tapered counterbore to form a narrow annular flow restriction between the flange and the counterbore.

Preferably, the reciprocating valve is a diaphragm valve with a spring-loaded spindle acting to seal the diaphragm against the valve seat, the diaphragm having a valve plug portion with a conically shaped downwards extension from which the radial flange projects to be in light, intimate contact with the counterbore when the tap is closed.

In a further embodiment of the present invention, the nozzle has a length/bore ratio such that it can retain a column of beer therein when the valve is closed so that, on slightly re-opening the valve, a creamy flow of beer is obtained.

In contradistinction to previous dispenser taps, a tap in accordance with this embodiment of the present invention produces a creamy flow by using a limited movement of the operating mechanism in the opening direction, it being possible to operate such a tap by:

opening it fully to fill a glass with the requisite amount of unfoamed beer, nearly closing the tap to obtain creamy flow to produce the desired "head", and then fully closing the tap.

This tap is not only easier to use but is very much easier to clean, the simple diaphragm construction and the provision of a variable gap, annular flow restrictor as a downstream extension of the valve member help form an essentially smooth and "pocket-free" flow path for beer through the tap.

In another embodiment of the present invention, the nozzle has a length/bore ratio such that it tends to be self-draining, so that a squib of beer can be produced to form a head on low carbonation beers in known manner; the nozzle being provided with a slot through the side wall of the nozzle and at the dispensing tip thereof; the slot inducing air bubbles to rise in any retained beer in the nozzle to aid the drainage thereof.

In contradistinction to air bleed holes or ducts, both of which directly communicate with the top of any retained column of beer, the slot is at the bottom of any such column and acts by inducing bubbles in the column; thus no bubbles can be entrained during normal dispensation and the slot is obviously simple to clean and make.

The above and other features of the present invention are illustrated by way of example, in the Drawings, wherein:

FIG. 3 is a part-sectional elevation of a "header" dispenser tap in accordance with a second embodiment of the present invention, the valve being in the fully open position;

FIG. 4 is a similar section to that of FIG. 3, but with the valve in the "header" position; and FIG. 5 is a detail end elevation of the bottom of the nozzle of the valve of FIGS. 3 and 4.

Figure 1:
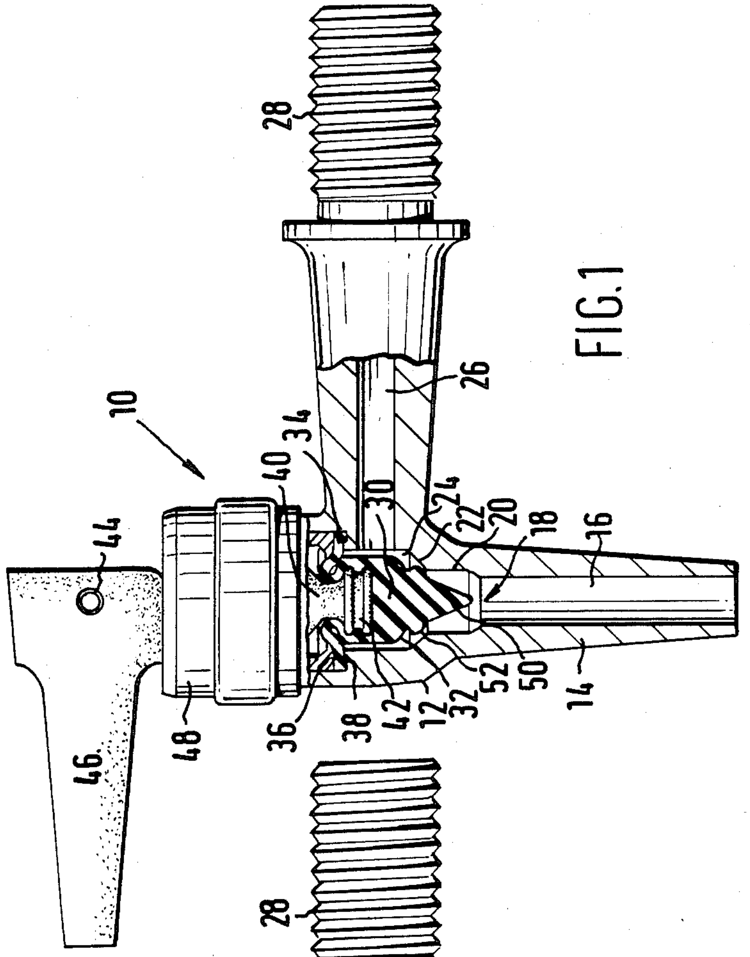
FIG. 1 is a part-sectional elevation of a "creamer" dispenser tap in accordance with one embodiment of the present invention, the valve being in the fully open position.
Figure 2:
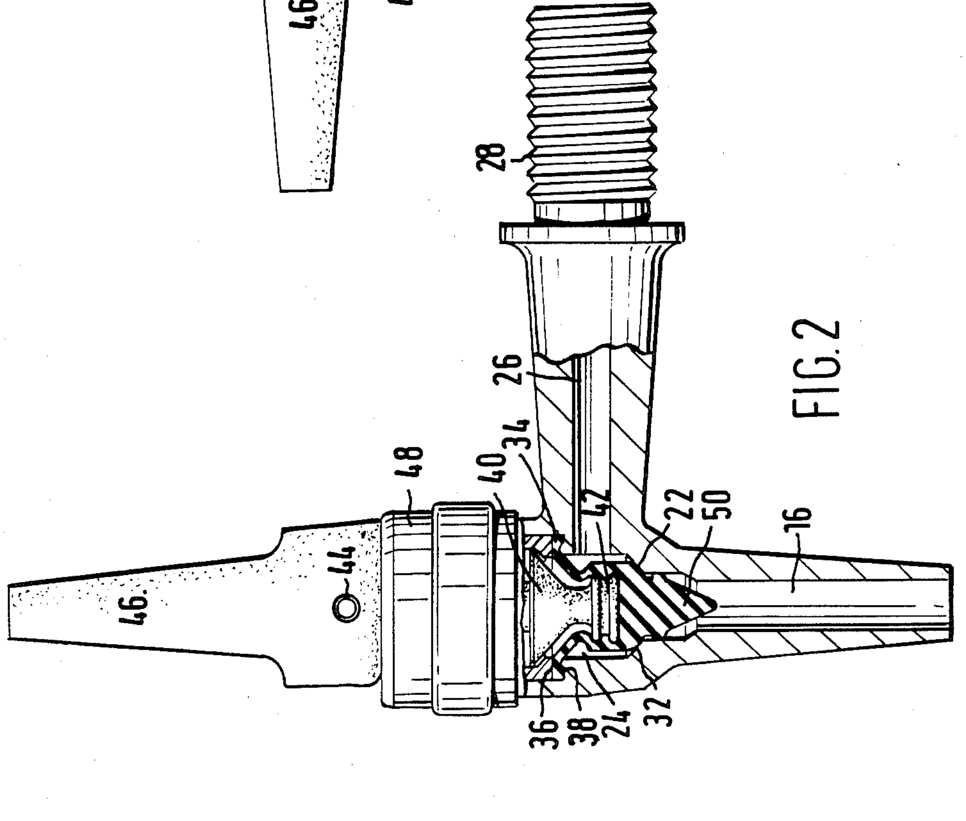
FIG. 2 is a similar section to that of FIG. 1, but with the valve in the "creamer" position.

As shown by FIGS. 1 and 2, a lever operated dispenser tap 10 has a generally cylindrical, hollow tap body 12 with an outlet nozzle 14, the bore 16 of which extends downwardly from a port 18 in the bottom of the valve body 12. Above the port 18 the bore expands in a gentle taper 20 until it meets a frusto-conical valve seat 22. A cylindrical chamber 24 is formed within the valve body 12 above the valve seat 22 and an integral inlet duct 26 opens radially into chamber 24 and has, at its exterior end, an externally threaded mounting spigot 28.

A valve member in the form of a diaphragm 30 has a plug portion 32, a flexible mid portion 34 and a gasket ring portion 36 and is located in the chamber 24 so that the plug portion 32 can seal against the valve seat 22 and the gasket ring 36 is trapped against a radial step 38 surrounding the upper part of the chamber 24.

The plug portion 32 is held against the valve seat 22 by a spring-loaded spindle 40, the lower end of which is shaped to engage with a tight fit within the plug portion, a radially inwardly projecting rib 42 engaging a peripheral groove near the spindle end. The spindle has at its upper end a pivot 44 on which is mounted an operating lever 46 having a conventional camming action against a valve cap 48 to lift the spindle (and hence open the tap, as shown in FIG. 1) when the lever is rotated anti-clockwise and to lower the spindle (and hence close the tap, as shown in FIG. 2) when rotated clockwise.

Plug portion 32 has a conically shaped downwards projection 50 with a radial flange 52 projecting outwardly therefrom; the flange 52 is sized so that it is in light, intimate contact with the tapered counterbore 20 when the tap is closed. As the diaphragm 30 is raised an annular gap of increasing size will be created between flange 52 and counterbore 20 due to the latter's taper.

In use, when the tap is open as shown in FIG. 1, the diaphragm plug portion 32 is raised clear of the conical valve seat 22 by the action of the lever 46 and spindle 40 which allows straight full flow of beer through the tap with little or no turbulence. The flow path, along inlet duct 26, through chamber 24, past valve seat 22, down counterbore 20, through port 18 and down nozzle bore 16 to emerge from the tap, being smooth and offering little in the way of any obstacle that would promote foaming of the beer as it is dispensed into a glass beneath the tap. When the tap is closed, a column of beer is retained in the nozzle bore 16, by virtue of the bore's length/bore ratio.

If the lever is then moved from its vertical, closed position to open the seal between plug portion 32 and seat 22 by an amount sufficient to permit production of full beer delivery pressure on the flange 52, the pressure drop created by the restriction of the narrow gap between the flange 52 and the counterbore 20 will produce a creamy flow of beer in known manner. An amount of creamy flow control is provided by the amount of flange lift relative to the counterbore taper and hence width of annular gap created; the gap width limiting flow.

The dispenser tap shown by FIGS. 3 to 5, is essentially the same as that of FIGS. 1 and 2, except that, to create a squirt facility, the nozzle has a bore 16 that must allow beer to drain away after delivery thereof to a glass. If beer were to be retained in the nozzle, the squirting action of the restriction between the flange 52 and the counterbore 22 upon "cracking" the tap open would damp down and almost eliminate the high velocity beer jet.

The length/bore ratio of the nozzle 14 is such that the bore will tend to self-drain. Draining is at least encouraged by the provision of a small slot 56 through a side wall 58 of the nozzle 14 at the dispense tip 60 thereof. The slot induces bubbles to rise in the tapped column of beer when the tap has been closed and beer flow shutoff; the rising bubbles promoting drainage from the nozzle.

I claim:

1. A tap, for a carbon dioxide gas pressure dispense system for beer, comprising:

a tap body;

a nozzle, forming part of said tap body, to convey dispensed beer to a receptacle therefor;

a counterbore in said tap body and communicating with said nozzle;

a valve seat within said tap body and about said counterbore;

a reciprocating valve housed in said tap body to control flow of beer through said tap;

said reciprocating valve having a valve member movable by a valve operating mechanism towards and away from said valve seat to close and open said tap;

said reciprocating valve being configured to minimize pressure drop and turbulence in the flow of beer through said tap when said valve member is in the open position;

said valve member having an extension that projects through said valve seat into said counterbore;

said extension having a radially outwardly directed flange that is always disposed within said counterbore defining a range of movement of said valve member proximate the closed position thereof;

said flange cooperating with said counterbore to define a narrow annulus to substantially restrict beer flow and create a turbulence-inducing pressure drop so as to facilitate an automatic positioning of the valve operating mechanism by an operator to a turbulence and pressure drop-inducing position within said range and hence a generally automatic production of foam in the tap prior to said flange leaving said counterbore in an opening direction or after said flange enters the counterbore in a closing direction and without requiring manuel adjustment of the parts of the reciprocating valve and the operating mechanism relative to each other.

2. A tap as claimed in claim 1, wherein:

said reciprocating valve is a diaphragm valve;

said valve member is a plug portion of the diaphragm moved by said valve operating mechanism to seal said valve plug portion against said valve seat and close said tap;

said valve member has a conically shaped downwards integral extension;

said counterbore is tapered; and said radial flange projects from said conical extension to be in light intimate contact with said tapered counterbore when said valve member is in the closed position.

3. A tap as claimed in claim 2, wherein said nozzle has a length/bore ratio such that it can retain a column of beer therein when said valve member is in the closed position so that, on slightly reopening said valve member, a creamy flow of beer is obtained.

4. A tap as claimed in claim 2, wherein said nozzle has a length/bore ratio such that said nozzle tends to be self-draining and is provided with a slot opening transversely through the side wall of said nozzle at the dispensing tip thereof, the slot acting to induce air bubbles to rise in any beer retained in the nozzle toaid the drainage thereof when said valve member is in the closed position, whereby a aquib of beer can be produced on reopening said valve member to form a head on low carbonation beers.

* * * * *